(12) United States Patent
Duvall

(10) Patent No.: US 6,481,036 B1
(45) Date of Patent: Nov. 19, 2002

(54) MODULAR CABLE PROTECTOR HAVING REMOVABLE WHEEL CHAIR RAMPS

(75) Inventor: John F. Duvall, Highlands Ranch, CO (US)

(73) Assignee: Checkers Industrial Products, Inc., Louisville, CO (US)

(*) Notice: Subject to any disclaimer, the term of this patent is extended or adjusted under 35 U.S.C. 154(b) by 0 days.

(21) Appl. No.: 09/938,078

(22) Filed: Aug. 23, 2001

(51) Int. Cl.$^7$ ............................................. F16L 57/00
(52) U.S. Cl. ...................... 14/69.5; 414/921; 138/110; 104/275
(58) Field of Search .................. 14/69.5, 71.1; 104/275, 276, 277; 138/106, 110; 414/921; D34/32; 254/88; 248/352

(56) References Cited

U.S. PATENT DOCUMENTS

| | | | |
|---|---|---|---|
| 72,028 A | * 10/1867 | Haase | 104/276 |
| 883,186 A | * 3/1908 | Fine | 104/275 |
| 1,914,830 A | 6/1933 | Kostohris | |
| 2,027,619 A | * 1/1936 | Rutherford | 14/69.5 |
| 2,166,031 A | * 7/1939 | Wendell | 104/275 |
| 2,594,425 A | * 4/1952 | Greenberg | D34/32 |
| 2,927,396 A | 3/1960 | Hall, Jr. | |
| 3,965,967 A | 6/1976 | Jentzsch et al. | |
| 4,067,258 A | 1/1978 | Valeri | |
| 4,101,100 A | 7/1978 | Smith et al. | |
| 4,373,306 A | * 2/1983 | Rech | 52/98 |
| 4,677,799 A | 7/1987 | Zarembo | |
| 4,817,224 A | * 4/1989 | Visnaw et al. | 14/69.5 |
| 4,819,910 A | * 4/1989 | Johnston | 254/88 |
| 5,095,822 A | 3/1992 | Martin | |
| 5,267,367 A | 12/1993 | Wegmann, Jr. | |
| 5,446,937 A | * 9/1995 | Haskins | 14/69.5 |
| 5,566,622 A | 10/1996 | Ziaylek, Jr. et al. | |
| 5,777,266 A | 7/1998 | Herman et al. | |
| D412,490 S | 8/1999 | Henry | |
| 5,933,898 A | 8/1999 | Estes et al. | |
| D415,112 S | 10/1999 | Henry | |
| D415,471 S | 10/1999 | Henry | |
| D418,818 S | 1/2000 | Henry | |
| D429,695 S | 8/2000 | Henry | |
| D437,832 S | 2/2001 | Henry | |
| 6,202,565 B1 | 3/2001 | Henry | |
| 2002/0038716 A1 | * 4/2002 | Pineda | 174/68.3 |

FOREIGN PATENT DOCUMENTS

DE  20012041 U1 * 2/2001 ........... E01C/11/22

* cited by examiner

Primary Examiner—Robert E. Pezzuto
Assistant Examiner—Alexandra K. Pechhold
(74) Attorney, Agent, or Firm—Dorr, Carson, Sloan & Birney, P.C.

(57) ABSTRACT

A modular cable bridging assembly has a cable protector with side ramps, and a series of channels extending between its ends to receive cables or the like. End connectors enable the cable protectors to be attached together in series to any desired length. Secondary ramps can be removably attached over each side ramp of a cable protector for handicapped access. Each secondary ramp has a base extending laterally beyond the side ramp, and an upper surface extending over the side ramp having a slope that is less than that of the underlying side ramp. A secondary ramp connector is used to removably attach the secondary ramp to the cable protector. Edge rails can be removably attached to the secondary ramps for safety and structural rigidity.

21 Claims, 7 Drawing Sheets

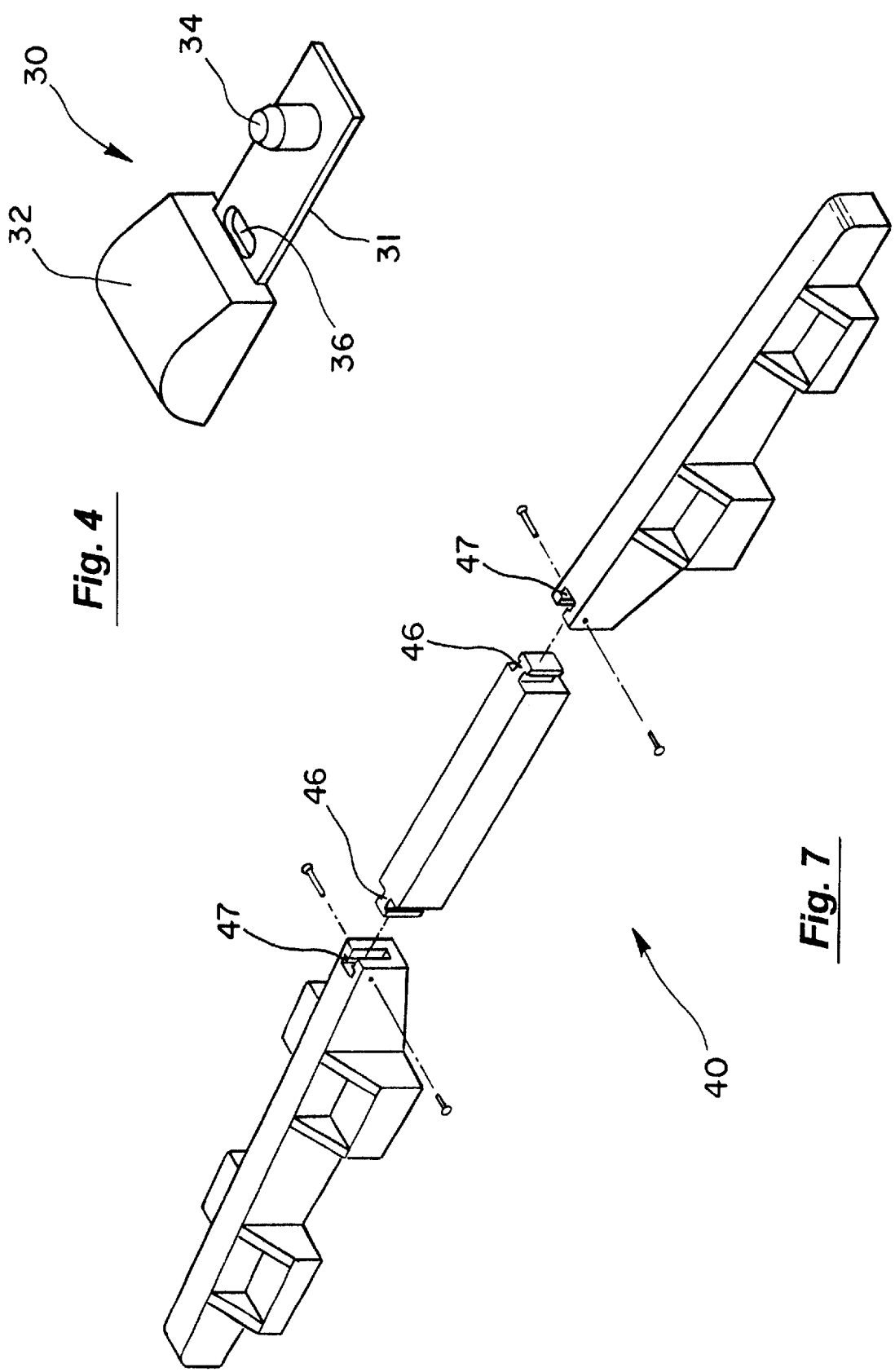

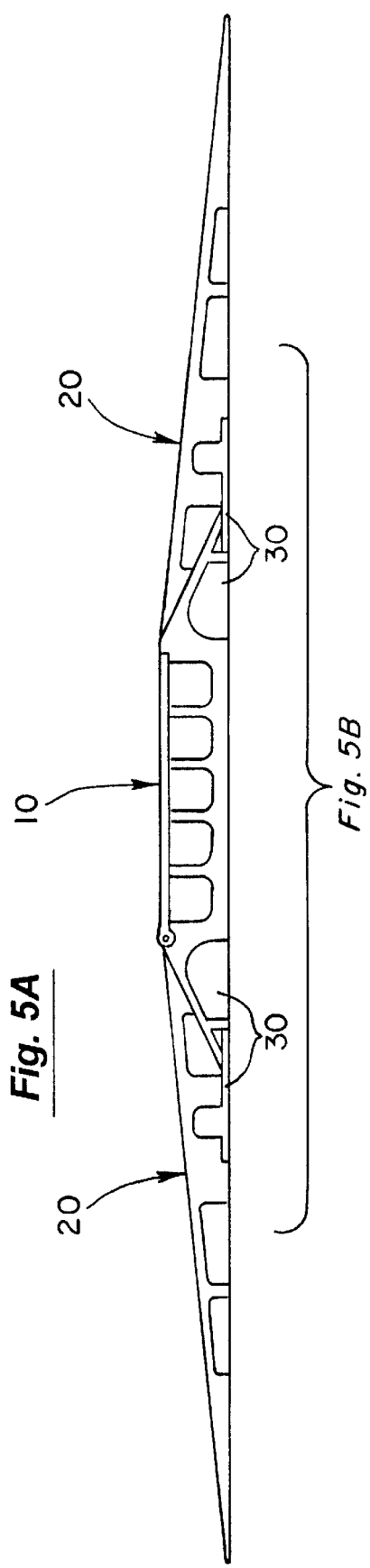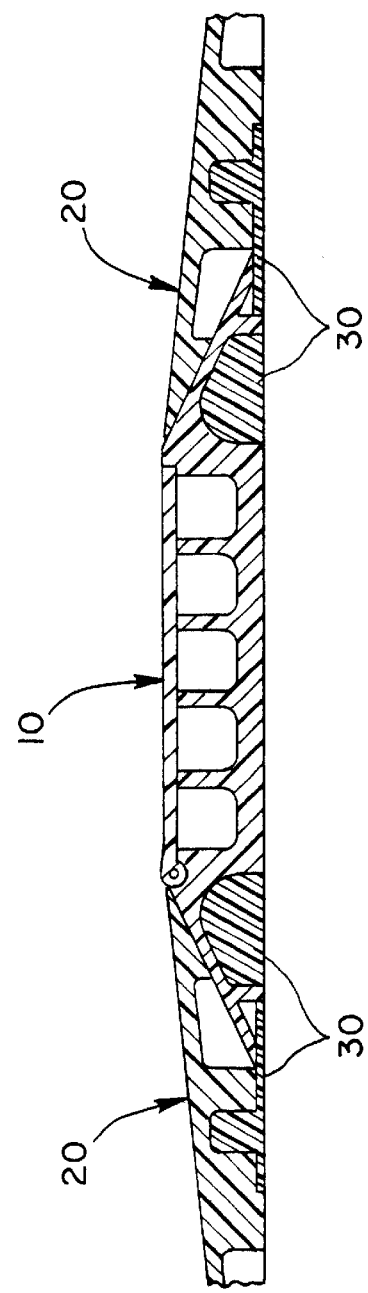
*Fig. 5A*
*Fig. 5B*

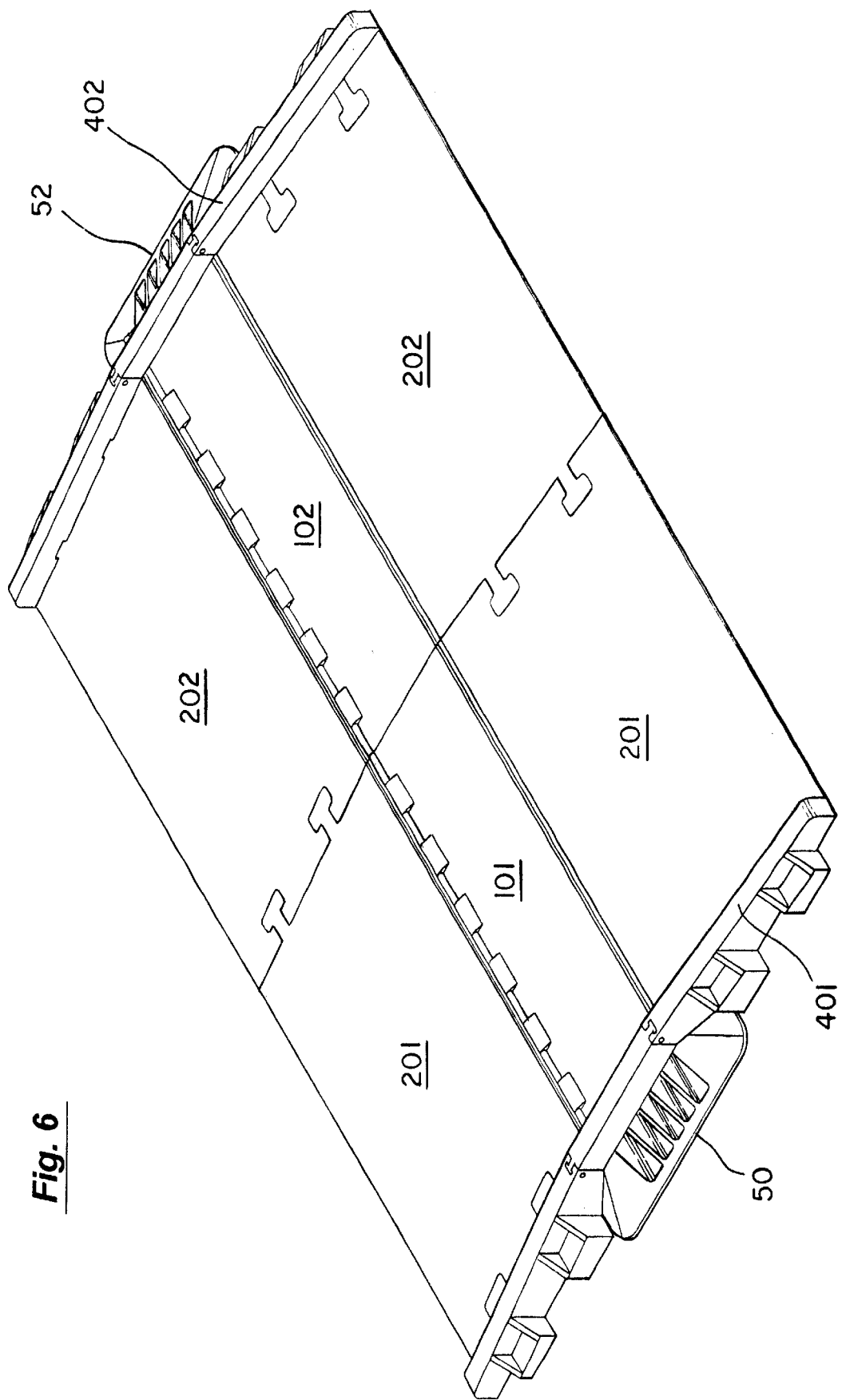

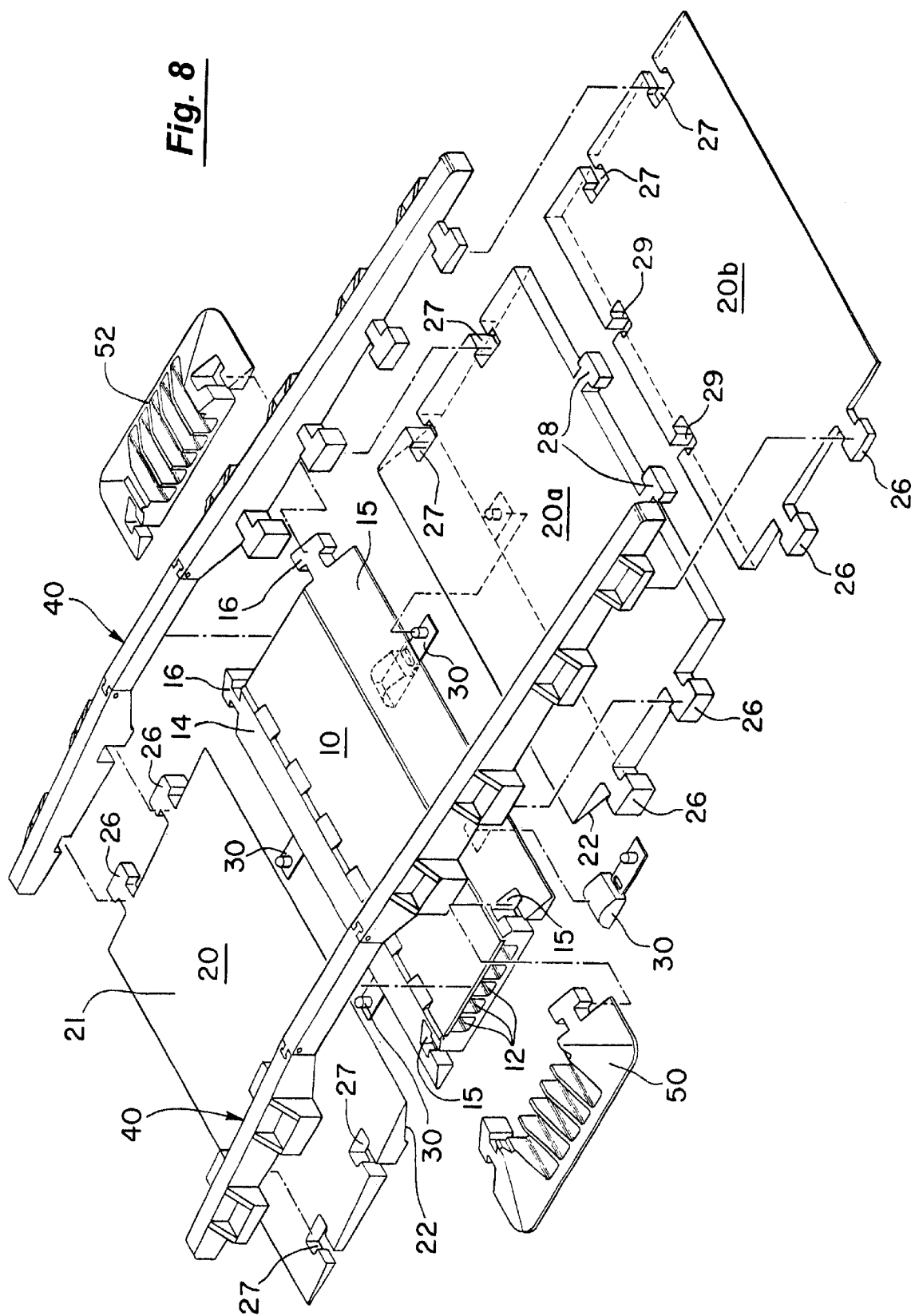

MODULAR CABLE PROTECTOR HAVING REMOVABLE WHEEL CHAIR RAMPS

BACKGROUND OF THE INVENTION

1. Field of the Invention.

The present invention relates generally to the field of hose and cable bridges. More specifically, the present invention discloses a modular cable bridging protective device that can be equipped with removable ramps for handicapped access.

2. Statement of the Problem.

Hose and cable bridging protective devices have been used in the past to prevent damage for hoses, cables, wiring and the like by vehicles and pedestrians. These cable protectors also help to minimize the risk of pedestrians tripping over cables. For the purposes of this disclosure, the term "cable" should be broadly interpreted to include cables, hoses, electrical wiring, conduits, optical fibers, pneumatic tubing, plumbing, and the like.

Conventional cable protectors include one or more channels extending in parallel between the ends of the cable protector to receive the cables. Side ramps or beveled edges extend laterally outward from both sides of the cable protector to allow vehicles to roll over the top of the cable protector. Each cable protector typically includes a set of end connectors that enable a series of cable protectors to be attached together in a modular end-to-end fashion to any desired length.

The side ramps on conventional cable protectors tend to have a relatively short base and steep slope. The slope of the side ramps is not a significant problem for pedestrians, powered vehicles, and other wheeled vehicles propelled by a person of at least average strength. However, conventional cable protectors can be a significant hurdle or an insurmountable obstacle to the handicapped. In particular, a wheelchair typically requires a ramp with a significantly smaller slope so that it can be propelled over the cable protector with minimal effort. The ramp should also be equipped with side rails to restrain the wheelchair from falling off the edges of the ramp. This configuration would also be advantageous for baby strollers, walkers, bicycles, tricycles, scooters, wagons, roller blades, skateboards, and the like.

Therefore, a need exists for an attachment that can be used in conjunction with cable protectors to facilitate handicapped access. In particular, the attachment should ideally be lightweight, easily stored, modular, and readily attachable at a desired location along a series of cable protectors. In addition, the attachment should provide a rail or raised edge on either side of the ramp for safety reasons, and allow modular end-to-end connection of the attachment so that the wheelchair ramp can be extended to a desired width.

3. Prior Art. The prior art in the field includes the following:

| Inventor | Patent No. | Issue Date |
|---|---|---|
| Kostohris | 1,914,830 | Jun. 20, 1933 |
| Hall | 2,927,396 | Mar. 8, 1960 |
| Jentzsch et al. | 3,965,967 | Jun. 29, 1976 |
| Valeri | 4,067,258 | Jan. 10, 1978 |
| Smith et al. | 4,101,100 | Jul. 18, 1978 |
| Zarembo | 4,677,799 | Jul. 7, 1987 |
| Martin | 5,095,822 | Mar. 17, 1992 |
| Wegmann, Jr. | 5,267,367 | Dec. 7, 1993 |

-continued

| Inventor | Patent No. | Issue Date |
|---|---|---|
| Ziaylek, Jr. et al. | 5,566,622 | Oct. 22, 1996 |
| Herman et al. | 5,777,266 | Jul. 7, 1998 |
| Henry | Des. 412,490 | Aug. 3, 1999 |
| Estes et al. | 5,933,898 | Aug. 10, 1999 |
| Henry | Des. 415,112 | Oct. 12, 1999 |
| Henry | Des. 415,471 | Oct. 19, 1999 |
| Henry | Des. 418,818 | Jan. 11, 2000 |
| Henry | Des. 429,695 | Aug. 22, 2000 |
| Henry | Des. 436,578 | Jan. 23, 2001 |
| Henry | Des. 437,832 | Feb. 20, 2001 |
| Henry | 6,202,565 | Mar. 20, 2001 |

The Henry design patents show a variety of modular cable protectors and connectors for modular cable protectors.

The Henry '565 patent discloses modular cable bridging device having modular central members and ramps that can be readily connected together in side-by-side or end-to-end relationships by means of connectors.

Herman et al. disclose a cable protection system consisting of modular components that can be detachably interlocked in desired combinations by means of male and female connectors on each modular component. These modular components include cable protector modules, ramps, and curb pieces.

Kostohris discloses a flexible device that protects fire hoses by providing opposing ramps forming a passage over the hose. Kostohris teaches that additional units may be placed end to end and secured together using loosely fitting dovetail lugs and recesses molded into the device.

Jentzsch et al. teach a portable crossover for high tonnage earth moving vehicles having a U-shaped channel and a strip for covering the channel, and further includes a rigid plate or cable for connecting a tow vehicle to relocate the crossover.

Valeri teaches a crossover unit with a wedge-shaped rubber insert or plug that resists deflection and closes the hose-receiving slot.

Smith et al. teach an aircraft flight line servicing system in which the distribution lines run under a multi-sectional unit of extruded aluminum sections that lock together.

Zarembo discloses a multi-sectional raceway for use in combination with a pair of interconnected detection system panels. The sections are flexibly interconnected by pressure engageable members and at least one E-shaped girder structure underneath the entire width of the platform section provides passageways for electrical wiring.

Martin teaches a cable crossover device for protecting electrical cables having a hinged lid secured by Velcro that covers the conduit and assumes part of the load. Modular sections can be coupled together by a strengthened interlocking system allowing for a variable length device.

Wegmann, Jr. discloses an interlocking, elongate ramp with a covered conduit channel. Adjacent ramp units are interlocked with members that project outwardly and upwardly from the end of each ramp unit to form a chain of ramp units.

Ziaylek, Jr. et al. disclose a collapsible hose bridge having a central support member that covers the hose, and two detachable ramps. Each ramp is attached by means of a curved lip that engages an arcuate slot running the length of the central support member. Ziaylek, Jr. et al., also show an alternative embodiment that permits several central support members to be connected side by side.

Estes et al. disclose a portable wheel chair ramp consisting of a series of hinged panels.

Hall shows a toy miniature bridge and overpass.

4. Solution to the Problem. None of the prior art references discussed above show a modular cable protector that can either be connected together in an end-to-end configuration for bridging cables or hoses, or equipped with optional secondary ramps at desired positions along the length of the cable protector assembly for wheel chair accessibility. The present invention also allows modular edge rails to be attached to ends of the cable protector and secondary ramps for additional safety and structural reinforcement of the assembly.

SUMMARY OF THE INVENTION

This invention provides a modular cable bridging assembly having a cable protector with side ramps, and a series of channels extending between its ends to receive cables or the like. End connectors enable the cable protectors to be attached together in series to any desired length. Secondary ramps can be removably attached over each side ramp of a cable protector for handicapped access. Each secondary ramp has a base extending laterally beyond the side ramp, and an upper surface extending over the side ramp having a slope that is less than that of the underlying side ramp. A secondary ramp connector is used to removably attach the secondary ramp to the cable protector. Edge rails can be removably attached to the secondary ramps for safety and structural rigidity.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which:

FIG. 4 is a top perspective view of a ramp connector 30.

FIG. 5A is a cross-sectional view of an assembly of a cable protector 10 and secondary ramps 20.

FIG. 5B is a detail cross-sectional view of the central portion of the assembly depicted in FIG. 5A.

FIG. 6 is a top perspective view of an assembly of two cable protectors 101, 102 attached end-to-end with secondary ramps 201, 202 and edge rails 401, 402.

FIG. 7 is a exploded perspective view of an alternative embodiment of an edge rail 40 made of three segments that can be pinned together.

FIG. 8 is an exploded top perspective view of an embodiment of a cable protector 10 in which one of the secondary ramps is formed from two segments 20a and 20b.

DETAILED DESCRIPTION OF THE INVENTION

Figure 1:
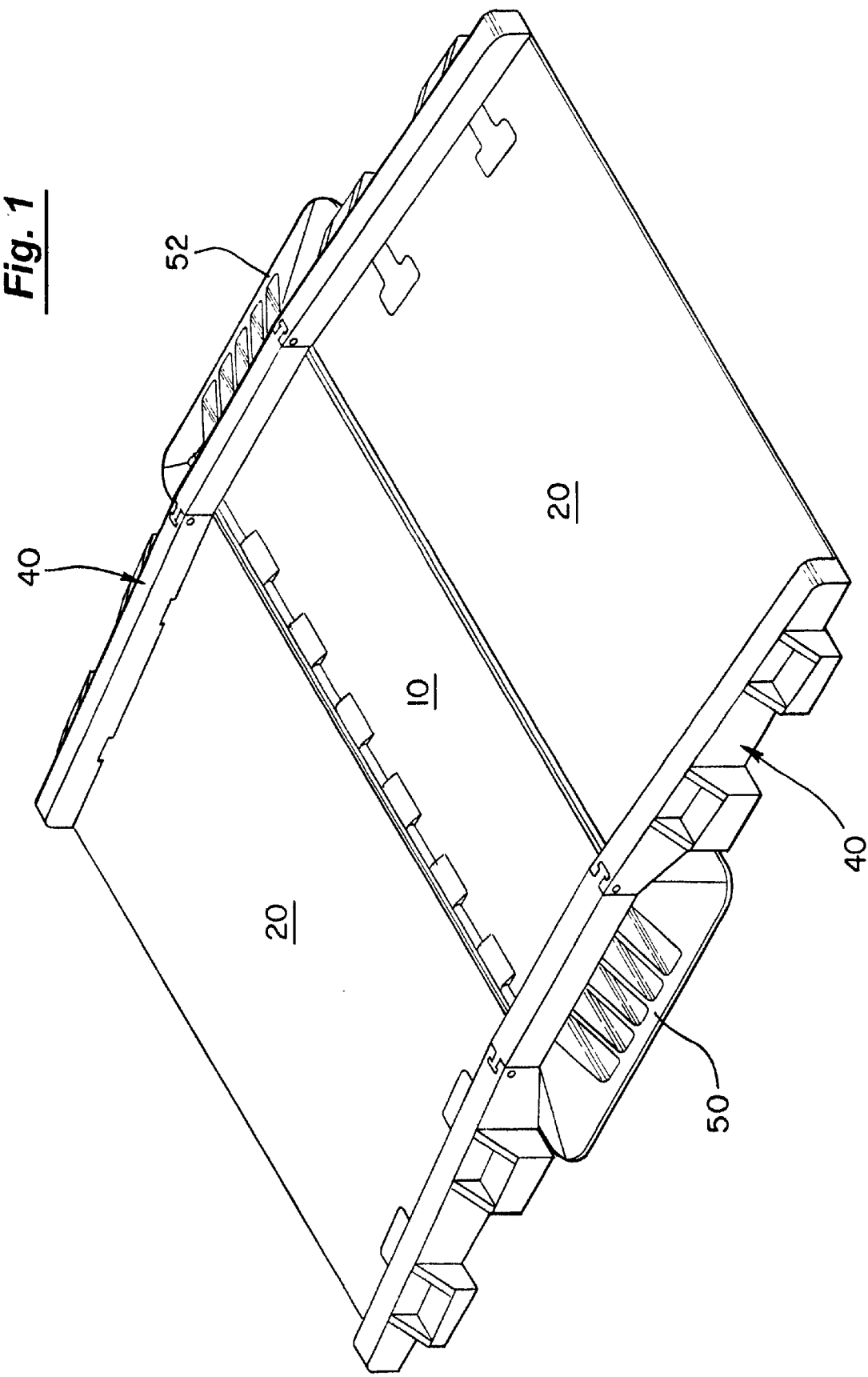
FIG. 1 is a top perspective view of an embodiment of the present invention in which two secondary ramps 20 and two edge rails 40 are assembled with a single cable protector 10.
Figure 2:
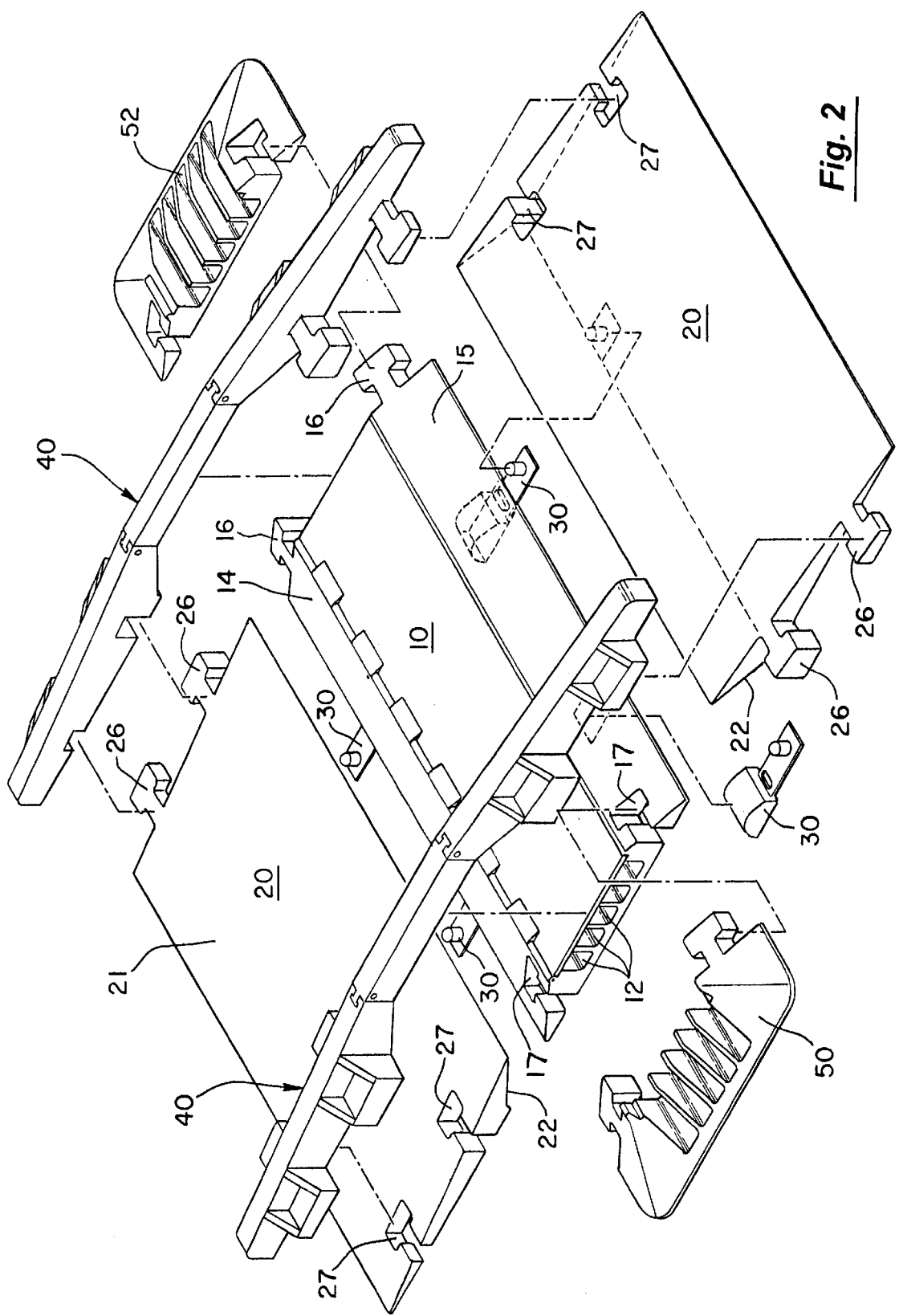
FIG. 2 is an exploded top perspective view of a cable protector 10 with secondary ramps 20 and edge rails 40.
Figure 3:
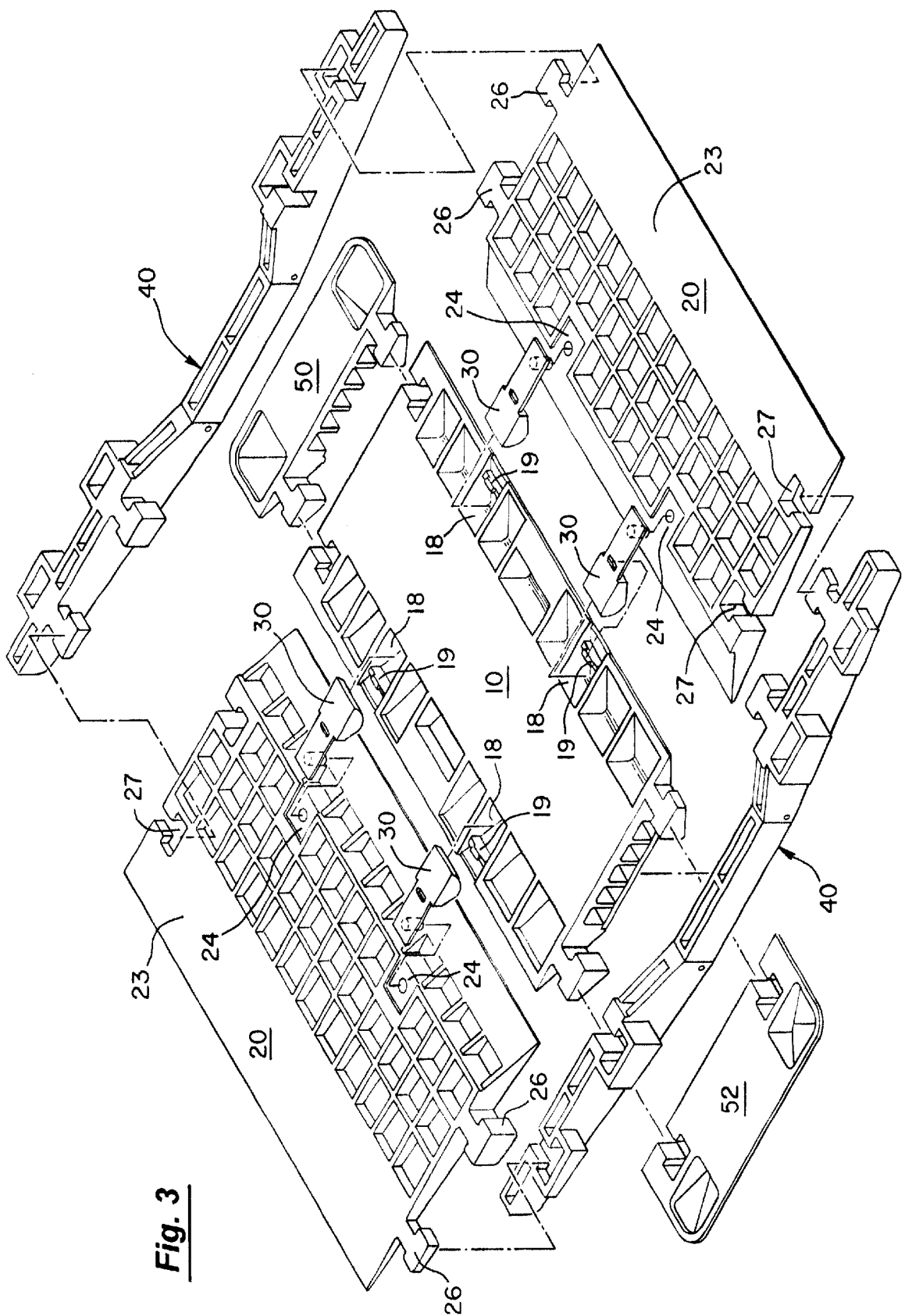
FIG. 3 is an exploded bottom perspective view corresponding to FIGS. 1 and 2.

Turning to FIG. 1, a top perspective view is provided of an embodiment of the present invention in which two secondary ramps 20 and two edge rails 40 are assembled with a single cable protector 10. Corresponding top and bottom exploded perspective views are illustrated in FIGS. 2 and 3, respectively. The cable protector 10 typically includes a plurality of channels 12 extending in parallel between the opposing ends of the cable protector 10. These channels 12 are intended to receive one or more cables, hoses, or the like. Optionally, a flat hinged lid can be used to cover the channels and their cables. An end piece 50 can also be attached to the end of the channels 12 to provide a transition for the cables.

Two side ramps 14, 15 extend laterally outward from the sides of the cable protector 10. These side ramps 14, 15 have a predetermined slope so that small vehicles and carts can roll up one side ramp 14, over the top of the cable protector 10, and down the other side ramp 15. The side ramps 14, 15 also help to prevent pedestrians from tripping over the cable protector or cables, as previously discussed.

The ends of each cable protector 10 are equipped with complementary sets of end connectors 16, 17 that enable a series of cable protectors to be attached together in a modular, end-to-end relationship to any desired length. For example, the end connectors 16, 17 can be shaped as male and female T-shaped connectors as shown in FIG. 2.

FIG. 3 includes a view of the bottom of a cable protector 10. A series of recesses or voids 18 are typically molded into the bottom of cable protector 10, and particularly the bottom surface of the side ramps 14, 15. These recesses 18 were originally intended to reduce the weight and cost of the cable protector and to simplify the molding process. In the present invention, a series of small tabs 19 are also formed on the bottom of the side ramps 14, 15 adjacent to the recesses 18. These tabs 19 can be used to engage and hold secondary ramp connectors 30 to the cable protector 10, as will be described below.

The present invention enables secondary ramps 20 to be removably attachable over either or both of the side ramps 14, 15 of a cable protector 10 and thereby provide a more gradual slope than that provided by the side ramps themselves. For example, the secondary ramps 20 can be use as wheel chair ramps or for handicapped access. Each secondary ramp 20 has a generally obtuse triangular cross-section as is shown most clearly in FIGS. 5A and 5B. In particular, each secondary ramp has an upper surface 21, a base 23 that extends laterally beyond the side ramp in contact with the ground, and a second surface 22 that contacts the top of the side ramp to form an obtuse angle with respect to the base 23. The upper surface 21 has a slope less than the slope of the side ramp 14, 15 of the cable protector 10. The secondary ramps 20 can be used singly or in pairs on either side of a cable protector 10. In the preferred embodiment, the secondary ramps 20 are completely modular and interchangeable, so that the completed assembly will be symmetrical and have the same upward and downward slope on either side of the cable protector 10. However, secondary ramps 20 could be designed with any desired proportions, dimensions, or slope.

A plurality of recesses 24 are formed in the base 23 of the secondary ramp 20. In the preferred embodiment, these recesses 24 are generally aligned with and adjacent to corresponding recesses 18 on the underside of the side ramp 14, 15 of the cable protector 10 when assembled.

FIG. 4 is a top perspective view of a secondary ramp connector 30 used to removably secure a secondary ramp 20 to a cable protector 10. In the embodiment depicted in FIG. 4, the secondary ramp connector 30 has a base strip 31 that contacts the ground, a first protrusion 32 that engages a recess 18 in the underside of a side ramp 14, 15, and a second protrusion 34 that engages a corresponding recess 24 in underside of a secondary ramp 20. The secondary ramp 20 and cable protector 10 are held on the protrusions 32, 34 of the secondary ramp connector 30 largely by gravity. The base strip 31 of the secondary ramp connector 30 prevents any significant lateral motion. FIG. 5A is a cross-sectional view of an assembly of the cable protector 10 and secondary ramps 20. FIG. 5B is a detail cross-sectional view of the central portion of the assembly depicted in FIG. 5A.

It should be expressly understood that other types of fasteners, clips, pins, bolts, screws, or other types of connectors could be substituted to fasten the secondary ramps 20 to the cable protector 10. In addition, the secondary ramp connector 30 could be formed as an integral part of either the secondary ramp 20 or the cable protector 10.

Depending on the type of secondary ramp connector 30 being used, and the degree to which a snug fit can be obtained between the secondary ramp connector 30 and the recesses 18 and 24, it may be desirable to provide an alternative means for attaching the secondary ramp connector 30 to either the cable protector 10 or secondary ramp 20. The secondary ramp connector 30 is relatively small and might otherwise become lost while the components are being transported or stored. For example, a small hole 36 or detent can be formed in the base strip 31 of the secondary ramp connector 30 to engage a corresponding tab 19 extending downward from the underside of the cable protector 10, and thereby attach the secondary ramp connector 30 on the cable protector 10.

As shown in FIG. 6, the secondary ramp 20 can also be equipped with end connectors 26, 27 to enable a plurality of secondary ramps to be removably connected together in an end-to-end relationship. For example, these end connectors 26, 27 can be formed as complementary male and female T-shaped connectors as shown in the figures. However, other types of connectors could be readily substituted.

It should be readily understood that the secondary ramps 20 can be use singly or in pairs with a cable protector 10. In addition, since the cable protectors 10 can be connected together in an end-to-end fashion to achieve any desired length, the secondary ramps 20 can also be connected together a modular end-to-end relationship. This enables the owner to create a wheelchair ramp or pedestrian ramp of any desired width. For example, FIG. 6 depicts an assembly of two cable protectors 101, 102 attached end-to-end with two pairs of secondary ramps 201, 202.

Edge rails 40 can be removably attached to either or both edges of the secondary ramps 20. For example, two edge rails 401 and 402 are illustrated in FIG. 6. In the preferred embodiment, each edge rail is provided with male and female end connectors that removably engage the corresponding end connectors 26, 27 on the secondary ramps 20. The edge rails are intended to serve as raised lips or walls to help prevent people or vehicles from falling off the edges of the secondary ramps 20. The edge rails could be extended upward to any desired height (e.g., as a hand rail). The edge rail 40 can be molded in one piece, or as several segments that can be joined together using pinned T-connectors 46, 47 as illustrated in FIG. 7 to minimize storage space. Alternatively, the segments of the edge rail 40 could be attached using pins, bolts, screws, fasteners, or the like. Each edge rail is typically used in combination with two secondary ramps 20 and one cable protector 10 as shown in the figures. However, a shortened edge rail could be used with a single secondary ramp.

To assemble the present invention, one or more cable protectors 10 are laid end-to-end along the desired path for the cables and are then connected by interlocking their end connectors. Secondary ramp connectors 30 are inserted under the side ramps 14, 15 of the cable protector(s) requiring secondary ramps 20. The secondary ramps 20 are placed over the side ramps of the cable protector(s) so that the secondary ramp connectors 30 engage secondary ramps 20. If a series of secondary ramps 20 are connected adjacent to one another, their end connectors 26 and 27 should be fastened together to provide added strength and rigidity for the assembly. Cables can be routed along the channels 12 in the cable protectors 10 at any time during these steps. Finally, edge rails 40 can be attached to the secondary ramps 20. It should be understood that this is merely one example of many possible ways of assembling the present invention. In addition, the assembly can be readily reconfigured and secondary ramps can be added or removed at any time.

FIG. 8 is an exploded top perspective view of an embodiment of a cable protector 10 in which one of the secondary ramps is formed from two or more segments 20a and 20b. Any number of segments can be used to extend the secondary ramp to any desired length and slope. A set of connectors allow these segments 20a, 20b to be removably attached to one another. For example, complementary male and female connectors 28 and 29 can be used for this purpose.

The above disclosure sets forth a number of embodiments of the present invention. Other arrangements or embodiments, not precisely set forth, could be practiced under the teachings of the present invention and as set forth in the following claims.

I claim:

1. A modular cable bridging assembly comprising:
   a cable protector with opposing ends having:
   (a) at least one channel extending between the ends of the cable protector to receive one or more cables; and
   (b) at least one side ramp having a first slope;
   a secondary ramp removably attachable to the cable protector having a base extending laterally beyond the side ramp, and an upper surface extending over the side ramp having a slope less than the first slope; and
   a secondary ramp connector to removably attach the secondary ramp to the cable protector.

2. The modular cable bridging assembly of claim 1 wherein the cable protector further comprises at least one end connector enabling end-to-end connection of a plurality of cable protectors.

3. The modular cable bridging assembly of claim 1 wherein the secondary ramp further comprises at least one end connector enabling end-to-end connection of a plurality of secondary ramps.

4. The modular cable bridging assembly of claim 1 wherein the secondary ramp connector comprises:
   a base member;
   a first protrusion on the base member removably engaging a corresponding recess in bottom of the side ramp; and
   a second protrusion on the base member removably engaging a corresponding recess in the base of the secondary ramp.

5. The modular cable bridging assembly of claim 4 wherein the secondary ramp connector further comprises a hole in the base member, and wherein the side ramp further comprises a protrusion insertable into the hole in the base member to retain the secondary ramp connector on the cable protector.

6. The modular cable bridging assembly of claim 1 further comprising an edge rail removably attachable to an end of the secondary ramp.

7. The modular cable bridging assembly of claim 6 wherein the secondary ramp further comprises at least one end connector enabling end-to-end connection of a plurality of secondary ramps, and wherein the edge rail removable engages the end connector of a secondary ramp.

8. The modular cable bridging assembly of claim 1 wherein the secondary ramp comprises a plurality of segments removably attached to one another.

9. A modular cable bridging assembly comprising:
a cable protector with opposing ends having:
(a) at least one channel extending between the ends of the cable protector to receive one or more cables;
(b) a side ramp having a first slope; and
(c) a recess on the bottom of the cable protector beneath side ramp;
a secondary ramp removably attachable to the cable protector having:
(a) a base extending laterally beyond the side ramp of the cable protector having recess therein; and
(b) an upper surface extending over the side ramp of the cable protector having a slope less than the first slope;
a secondary ramp connector to removably attach the secondary ramp to the cable protector having a first protrusion to removably engage the recess in the bottom of the cable protector and a second protrusion to removably engage the recess in the base of the secondary ramp.

10. The modular cable bridging assembly of claim 9 wherein the cable protector further comprises at least one end connector enabling end-to-end connection of a plurality of cable protectors.

11. The modular cable bridging assembly of claim 9 wherein the secondary ramp further comprises at least one end connector enabling end-to-end connection of a plurality of secondary ramps.

12. The modular cable bridging assembly of claim 9 further comprising an edge rail removably attachable to an end of the secondary ramp.

13. The modular cable bridging assembly of claim 12 wherein the secondary ramp further comprises at least one end connector enabling end-to-end connection of a plurality of secondary ramps, and wherein the edge rail removable engages the end connector of a secondary ramp.

14. In a modular cable bridging assembly having a cable protector with opposing ends, at least one channel extending between the ends of the cable protector to receive one or more cables, and at least one side ramp having a first slope, wherein the improvement comprises:
a secondary ramp removably attachable to the cable protector, each secondary ramp having a base extending laterally beyond the side ramp, and an upper surface extending over the side ramp of the cable protector having a slope less than the first slope; and
secondary ramp connector to removably attach the secondary ramp to the cable protector.

15. The modular cable bridging assembly of claim 14 wherein the secondary ramp connector comprises:
a base member;
a first protrusion on the base member removably engaging a corresponding recess in bottom of the side ramp; and
a second protrusion on the base member removably engaging a corresponding recess in the base of the secondary ramp.

16. The modular cable bridging assembly of claim 15 wherein the secondary ramp connector further comprises a hole in the base member, and wherein the side ramp further comprises a protrusion insertable into the hole in the base member to retain the secondary ramp connector on the cable protector.

17. The modular cable bridging assembly of claim 14 further comprising an edge rail removably attachable to an end of the secondary ramp.

18. The modular cable bridging assembly of claim 17 wherein the secondary ramp further comprises at least one end connector enabling end-to-end connection of a plurality of secondary ramps, and wherein the edge rail removably engages the end connector of a secondary ramp.

19. A modular cable bridging assembly comprising:
a cable protector with opposing ends having:
(a) at least one channel extending between the ends of the cable protector to receive one or more cables;
(b) at least one side ramp extending laterally outward and having a first slope; and
(c) end connectors on the ends of the cable protector enabling end-to-end connection of a plurality of cable protectors; a secondary ramp removably attachable to the cable protector having:
(a) a base extending laterally beyond the side ramp of the cable protector having recess therein;
(b) an upper surface extending over the side ramp of the cable protector having a slope less than the first slope; and
(c) end connectors on the ends of the secondary ramp enabling end-to-end connection of a plurality of secondary ramps;
secondary ramp connector to removably attach the secondary ramps to the cable protector; and
an edge rail removably engaging the end connector of a secondary ramp.

20. The modular cable bridging assembly of claim 19 wherein the secondary ramp connector comprises:
a base member;
a first protrusion on the base member removably engaging a corresponding recess in bottom of the side ramp; and
a second protrusion on the base member removably engaging a corresponding recess in the base of the secondary ramp.

21. The modular cable bridging assembly of claim 20 wherein the secondary ramp connector further comprises a hole in the base member, and wherein the side ramp further comprises a protrusion insertable into the hole in the base member to retain the secondary ramp connector on the cable protector.

* * * * *